Feb. 4, 1941.   W. J. RUSSELL ET AL   2,230,268
BROILER AND FRYER UNIT
Original Filed Feb. 13, 1937   2 Sheets-Sheet 2
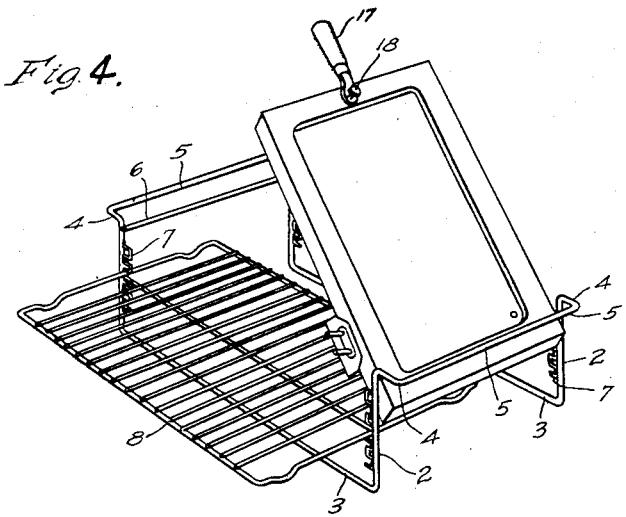
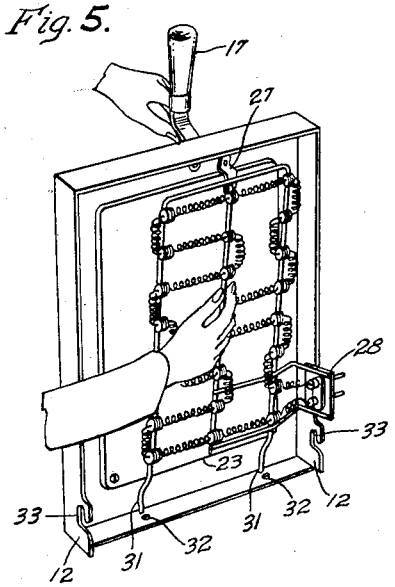
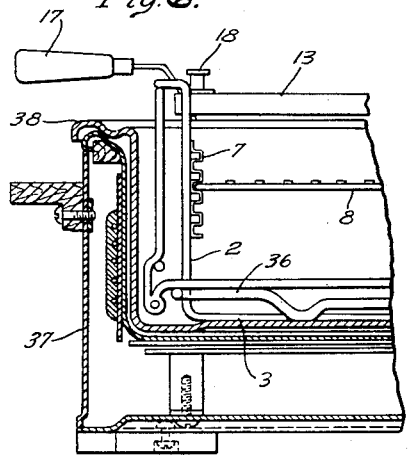
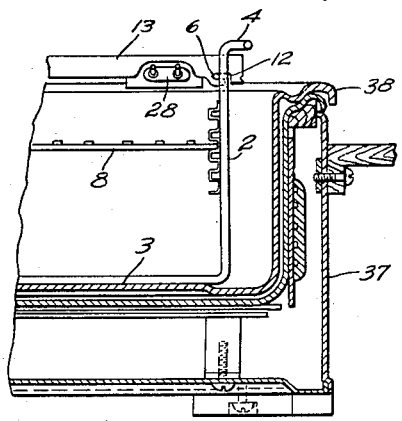
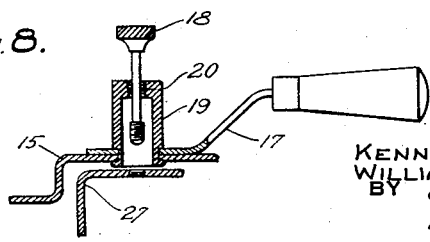
INVENTORS
KENNETH L. WOODMAN,
WILLIAM J. RUSSELL.
BY
ATTORNEY Patented Feb. 4, 1941

2,230,268

UNITED STATES PATENT OFFICE 2,230,268

BROILER AND FRYER UNIT

William J. Russell and Kenneth L. Woodman, Mansfield, Ohio, assignors to Westinghouse Electric & Manufacturing Company, East Pittsburgh, Pa., a corporation of Pennsylvania Original application February 13, 1937, Serial No. 125,598, now Patent No. 2,156,216, dated April 25, 1939. Divided and this application April 22, 1939, Serial No. 269,388

4 Claims. (Cl. 219—35)

This application is a division of our application Serial No. 125,598, filed February 13, 1937, resulting in Patent No. 2,156,216, dated April 25, 1939. That application describes and claims a cooking appliance comprising an open top roaster and a heating unit mounted adjacent the top thereof, whereby the appliance may be used for broiling and frying.

The present invention relates to an electric heating unit, more particularly to a removable broiler-grill or broiling and frying unit to be used within a roaster or the like, as described in the aforesaid application.

The invention has for an object to provide an improved heating unit of the character set forth.

A particular object is to provide a heating unit comprising an electric heating element and a heat shield which are readily detachable from each other.

These and other objects are effected by my invention as will be apparent from the following description and claims taken in accordance with the accompanying drawings, forming a part of this application, in which:

Fig. 4 is a perspective view of the structure shown in Fig. 1 with the heater unit in an inclined position and the tray member partially removed;

Fig. 5 is a perspective view of the heater unit illustrating the method of removing the heating element therefrom;

Figs. 6 and 7 are partial sectional views showing the rack and the heater unit in the roaster; and, Fig. 8 is an enlarged fragmentary view of a fastening device employed in the heater unit.

Figure 1:
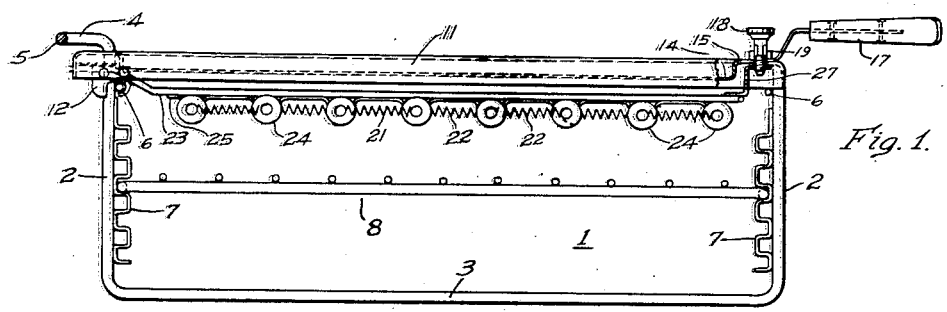
Fig. 1 is an elevational and partial sectional view of the rack and heater unit embodied in my invention.
Figure 2:
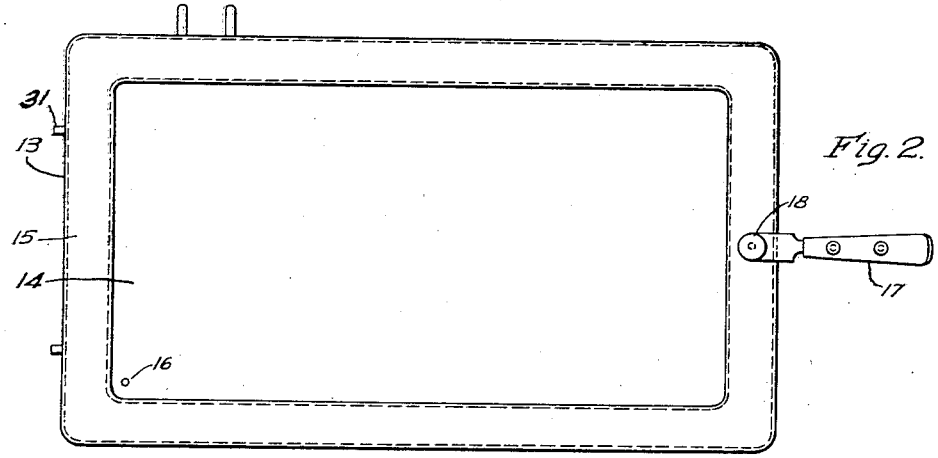
Figs. 2 and 3 are, respectively, a top view and a bottom view of the heater unit shown in Fig. 1.

Referring to Figs. 1 and 4, we show a rack 1 comprising upstanding support members 2, and longitudinal base members 3. An off-set portion 4 may be located at the upper portion of the upstanding support members 2 and may have a transverse rod 5 which may be used as a bail or handle for lifting and carrying the rack, rigidly attached to the ends of such portions and joining two end support members. Any suitable broiling tray or shelf 8 may be adjustably supported on serpentine tray supporting members 7 which may be rigidly attached to the inner side of the respective upstanding members 2. A bar 6 may be located intermediate each serpentine tray support 7 and the outward off-set portion 4 and may be rigidly attached to the upstanding support members 2 in any suitable manner.

A removable heater unit 11, comprising a downwardly flanged heat shield 13 and a heating element 21 may be swingably mounted upon the rack 1, about one of the intermediate bars 6, by means of hinge portions 12. The hinge portions 12 may be located at one end of the heat shield 13 and may have located therein an L-shaped aperture which receives the intermediate bar 6, permitting the heater unit 11 to swing thereon. The other end of the heater unit is adapted to rest directly on the bar 6 at the other end.

Figure 3:
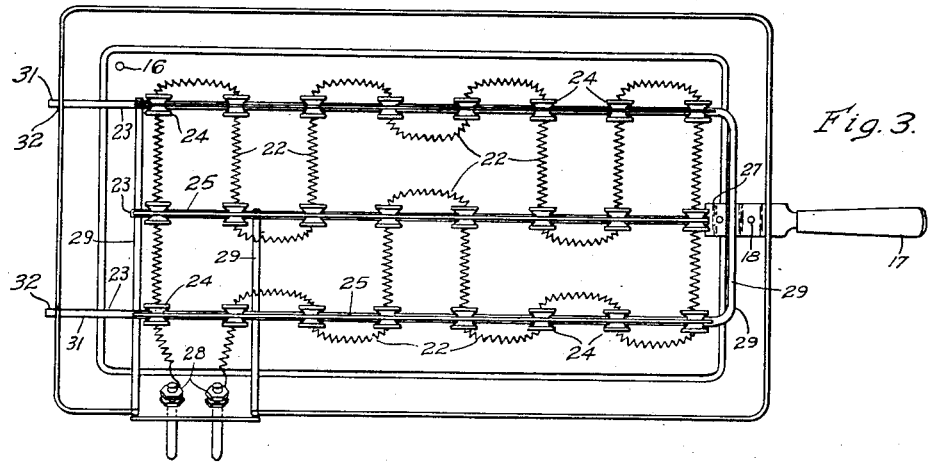

The heat shield 13 may have a dished portion 14 therein with an embossed or rim portion 15 about the edge thereof. The top surface of the dished portion 14 of the heat shield 13 may be used as a cooking surface (particularly for frying) while the under portion of such heat shield may function as a heat reflector. An aperture 16 may be located in one corner of the dished portion 14 or in any other desirable position to permit the draining of excess juices from the cooking surface. As shown in Fig. 3, the aperture 16 is spaced from the heating element 21 so that dripping of juice or other liquid on the heating element is avoided. A handle 17 may be rotatably attached to the heater unit 11 by means of a cylindrical collar 19 to facilitate the operator swinging the unit about the intermediate bar 6 or removing the heater unit.

The heating element 21 may be removably attached to the under portion of the heat shield 13 by means of a plurality of apertures 32 located at one end of said heat shield and a set screw 18, located at the other end of the heat shield and extending through the cylindrical collar 19. The heating element comprises a heating coil 22 and may be provided with a plurality of longitudinal members 23, and a plurality of transverse members 29. The heating coil 22 may be insulatedly attached to the longitudinal support members 23 by means of insulating grommets 24 which may be rigidly attached to the support members 23 by means of auxiliary support members 25. The heating coil 22 may terminate in any desirable plug or attachment 28, which enables such coil to be connected to a suitable power supply, not shown.

The outside longitudinal support members 23 of heating element 21 may have extended portions 31 angularly displaced from the plane of such heating element 21. These extended portions may engage the apertures 32 in one end of the heat shield 13 to aid in rigidly attaching the heating element 21 to such heat shield. An angular depending bracket 27 may be rigidly attached to the heating element 21 at the opposite end thereof and may have a threaded aperture therein which may engage the set screw 18 and rigidly attach the heating element 21 to the heat shield while the extended portions 31 are located within the aperture 32.

Set screw 18, which has merely the lower portion thereof threaded, may be located within the cylindrical collar 19, which attaches the handle 17 to the rim portion 15 of the heat shield 13, and which has only an upper or lip portion 20 thereof threaded. Thus, when the set screw is not operatively associated with the angular bracket 27 of the heating element 21, such set screw will slide freely within the cylindrical collar 19 without becoming disengaged therefrom. It is, therefore, obvious that set screw 18 may be removed from the heating element 21 without becoming disengaged from the heat shield 13, which, in turn ensures such set screw will not become misplaced or lost.

The heating element 21 may be removed from the heat shield 13 to permit the operator to clean the heat shield without injuring the heating element by backing off the set screw 18 with one hand, and as such set screw releases the angular bracket 27 the heating element 21 may be angularly displaced from such heating shield with the other hand as illustrated in Fig. 5. To remount the heating element 21 on the heat shield 13 the extended portions 31 of the longitudinal support members 23 are inserted within the apertures 32 and set screw 18 is run down into the angular bracket 27, pulling such bracket and the heating element 21 tightly against the underside of such heat shield. The heater unit 11 comprising the heating coil 21 and heat shield 13 may then be swingably mounted upon the intermediate bar 6 of the rack 1 by placing the L-shaped apertures of the hinge portions 12 about such intermediate bar. In such a position the handle 17 may be grasped and the heater unit 11 may then be swung outwardly until the outer portion of the heat shield 13 contacts the transverse bar 5. While in such a position the heater unit 11 will remain substantially in a vertical position. By grasping the handle 17 and swinging the heater unit 11 downwardly, such unit will rotate until the free end thereof will contact the second intermediate bar 6 and remain substantially in a horizontal position.

When it is desired to use the broiler or heater unit 11 for broiling or frying purposes, the rack 1 is located within the roaster. The trivet rack 36 shown in Fig. 7 may be omitted at this time as it is used for other cooking purposes which need not be here considered. The heater unit 11 is then swung upwardly into its substantially vertical position. The food to be cooked is placed upon the tray 8, which is located at the desired position upon the serpentine support 7. The heater unit is then lowered to its substantially horizontal position and the heating coil 21 is connected to a suitable power supply, not shown.

Grease spatterings while broiling will be avoided due to the location of the rack 1 within the roaster 37 and the presence of the heater unit 11 over the cooking material. The smoking which accompanies broiling will likewise be reduced due to the clearance between the heater unit and the familiar inset pan 38 which permits a small circulation of air.

To remove or inspect the broiled food it is only necessary to swing the heater member to its substantially vertical position when such food becomes readily accessible. The lower surface of the heat shield 13 will reflect a large portion of the heat radiated from the heating coil 21 and thus increase the operating efficiency of such coil or reduce the time required for a satisfactory broiling operation.

Whenever desired, the upper surface of the recessed portion 14 may be used as a grill or cooking surface upon which any desired material may be fried during a broiling operation without reducing the efficiency of such broiling operation. However, it is to be understood that the upper surface of the heat shield may be used as a grill or cooking surface without the need of a broiling operation being performed within the roaster.

It is, therefore, obvious that the broiler or heater unit 11 performs a dual function, namely, enables food placed below such unit and within the roaster to be broiled or browned, and enables food to be grilled or fried upon the cooking surface of the heat shield either simultaneously with such broiling action or as a separate function of the unit.

It is, therefore, obvious that in utilizing a rack and heater unit as hereinabove described in cooperation with a roaster, such heater unit may be used for either broiling or frying, or both simultaneously, and the excess heat from the heating element of such heater unit may be used to pre-heat the roaster, eliminating such requirement before starting the use thereof as a roaster.

Various modifications may be made in the device embodying my invention without departing from the spirit and scope thereof, and we desire, therefore, that only such limitations shall be placed thereon as are imposed by the prior art and the appended claims.

What we claim is:

1. A heating unit comprising an open radiant heating element and a metal plate serving to reflect radiant heat from said heating element, said heating element being provided with a wire frame comprising a U-shaped member having two spaced projecting ends, said heating element being insulatedly mounted on said frame, said plate member having spaced openings in which said projecting ends are adapted to be inserted upon relative movement of the heating element and the plate member in a direction parallel to the plane of the plate member, and means for detachably connecting said frame to said plate member with the projecting ends inserted in said opening, whereby said heating element and said plate member may be readily attached to and detached from each other.

2. A heating unit as set forth in claim 1, wherein said connecting means is spaced from said projecting ends and said openings.

3. A heating unit comprising an open heating element and a sheet metal member above the heating element for reflecting radiant heat downwardly, said sheet metal member having a right angle flange adjacent one edge formed with two spaced apertures therein, said heating element being provided with a supporting frame and being insulatedly mounted thereon, said frame having two spaced projections adapted to be inserted in said openings, and means for detachably fastening said frame to said sheet metal member adjacent the opposite edge thereof.

4. A heating unit comprising an open radiant heating element and a metal plate member serving to reflect radiant heat from said heating element, said heating element comprising a heating coil and being provided with a wire frame comprising a plurality of longitudinal members having spaced projecting ends and transverse members connecting said longitudinal members, and insulating grommets carried by said frame for insulatedly mounting said heating coil on said frame, said plate member having spaced openings in which said projecting ends are adapted to be inserted upon relative movement of the heating element and the plate member in a direction parallel to the plane of the plate member, and means for detachably connecting said frame to said plate member with the projecting ends inserted in said opening, whereby said heating element and said plate member may be readily attached to and detached from each other.

WILLIAM J. RUSSELL.
KENNETH L. WOODMAN.